(12) United States Patent
Shaji et al.

(10) Patent No.: US 10,810,494 B2
(45) Date of Patent: Oct. 20, 2020

(54) SYSTEMS, METHODS, AND COMPUTER PROGRAM PRODUCTS FOR EXTENDING, AUGMENTING AND ENHANCING SEARCHING AND SORTING CAPABILITIES BY LEARNING AND ADDING CONCEPTS ON THE FLY

(71) Applicant: EyeEm Mobile GmbH, Berlin (DE)

(72) Inventors: Appu Shaji, Berlin (DE); Ramzi Rizk, Berlin (DE); Harsimrat S. Sandhawalia, Berlin (DE); Ludwig G. W. Schmidt-Hackenberg, Berlin (DE)

( * ) Notice: Subject to any disclaimer, the term of this patent is extended or adjusted under 35 U.S.C. 154(b) by 250 days.

(21) Appl. No.: 15/670,951

(22) Filed: Aug. 7, 2017

(65) Prior Publication Data

US 2018/0039887 A1 Feb. 8, 2018

Related U.S. Application Data

(60) Provisional application No. 62/372,197, filed on Aug. 8, 2016.

(51) Int. Cl.
*G06N 3/08* (2006.01)
*G06K 9/62* (2006.01)
*G06K 9/00* (2006.01)
*G06F 3/048* (2013.01)
*G06N 3/04* (2006.01)
*G06K 9/68* (2006.01)

(52) U.S. Cl.
CPC ............ *G06N 3/084* (2013.01); *G06F 3/048* (2013.01); *G06K 9/00624* (2013.01); *G06K 9/00677* (2013.01); *G06K 9/627* (2013.01); *G06K 9/628* (2013.01); *G06K 9/6256* (2013.01); *G06K 9/6263* (2013.01); *G06K 9/6267* (2013.01); *G06N 3/0445* (2013.01); *G06N 3/0454* (2013.01); *G06K 9/00684* (2013.01); *G06K 2009/6864* (2013.01)

(58) Field of Classification Search
CPC .... G06N 3/084; G06N 3/0445; G06N 3/0454; G06K 9/6256; G06K 9/6267; G06K 9/00624; G06K 9/627; G06K 9/6263; G06K 9/628; G06K 9/00677; G06K 2009/6864; G06K 9/00684; G06F 3/048
See application file for complete search history.

(56) References Cited

U.S. PATENT DOCUMENTS 10,213,692 B2 * 2/2019 Velic .................. G06N 5/04
2011/0119208 A1 * 5/2011 Kirshenbaum .......... G06N 5/02
706/12

* cited by examiner

*Primary Examiner* — Menatoallah Youssef
(74) *Attorney, Agent, or Firm* — Rothwell, Figg, Ernst & Manbeck, P.C.

(57) ABSTRACT

A method of updating a classifier on-the-fly is provided. The method includes providing a base classifier. The base classifier is a neural network. The method further includes receiving a class and a set of images associated with the class. The method further includes splitting the set of images into an evaluation set and a training set. The method further includes updating the base classifier on-the-fly to provide an updated classifier. Updating the base classifier includes (1) extracting features for each image from the training set from the base classifier; (2) training the updated classifier using the extracted features; and (3) scoring the evaluation set with the updated classifier.

14 Claims, 7 Drawing Sheets

SYSTEMS, METHODS, AND COMPUTER PROGRAM PRODUCTS FOR EXTENDING, AUGMENTING AND ENHANCING SEARCHING AND SORTING CAPABILITIES BY LEARNING AND ADDING CONCEPTS ON THE FLY

CROSS REFERENCE TO RELATED APPLICATION(S)

This application claims priority to U.S. Provisional Application Ser. No. 62/372,197, entitled "SYSTEMS, METHODS, AND COMPUTER PROGRAM PRODUCTS FOR EXTENDING, AUGMENTING AND ENHANCING SEARCHING AND SORTING CAPABILITIES BY LEARNING AND ADDING CONCEPTS ON THE FLY," filed Aug. 8, 2016, which is incorporated herein by reference in its entirety.

U.S. application Ser. No. 14/726,172, entitled "SYSTEMS, METHODS, AND COMPUTER PROGRAM PRODUCTS FOR SEARCHING AND SORTING IMAGES BY AESTHETIC QUALITY", filed May 29, 2015, is incorporated herein by reference in its entirety.

U.S. application Ser. No. 14/506,103, entitled "SYSTEMS, METHODS, AND COMPUTER PROGRAM PRODUCTS FOR SEARCHING AND SORTING IMAGES BY AESTHETIC QUALITY", filed Oct. 3, 2014, is incorporated herein by reference in its entirety.

U.S. application Ser. No. 14/506,097, now U.S. Pat. No. 9,280,565, filed Oct. 3, 2014, is incorporated herein by reference in its entirety.

TECHNICAL FIELD

The present invention relates generally to systems, methods, and computer program products for enabling users to better manage, sort, search, display, and view images. More particularly, the present invention relates to indexing a search index with a new visual classifier on-the-fly.

BACKGROUND OF THE INVENTION

Existing systems for search algorithms rely on a search index.

For visual search, the entries in the search index come from metadata inside the image, user added tags, and also output from visual classifiers.

A survey of visual classifier based patent is available at allan.hanbury.eu/lib/exe/fetch.php?media=ijdar_revised_31august2012.pdf.

However, in all of the above systems visual classifiers need to be "pre-specified", trained and deployed into a production system.

Training a new classifier requires a collection of training data, performing the training with the collection of training data, integrating the newly-trained classifier into a search indexer and then re-building the search index. This is a time-consuming and slow process.

Accordingly, systems and methods where classifiers can be added to the system on the fly are needed.

With over a trillion photographs being taken every year, many of which are in digital format as images on the Internet, it is a growing problem to be able to manage, sort, search, display, and view such images based on keywords pertaining to an image. However, there is a semantic gap between images and keywords. For example, a keyword boxer can mean the boxer in sports context, as well as boxer as a breed of a dog.

Accordingly, systems and methods are needed to address these problems.

SUMMARY OF THE INVENTION

In accordance with some embodiments of the present invention, training a new classifier on-the-fly can happen with even as little as 10 to 50 instances of a class.

In some embodiments, the training happens in near real-time (e.g., less than 10 seconds for 10 images).

A user or a program can interact with the on-the-fly trainer to ensure the quality of the trained classifier. In some embodiments, the new classifier will only be integrated to the search process once certain checks are made.

An existing visual classifiers can be enhanced (i.e., trained with better precision and recall) or adapted to a different use cases very fast.

In some embodiments, a classifier is learned with images only, and can therefore be adapted easily based on a user's needs.

According to a first aspect, a method of updating a classifier on-the-fly is provided. The method includes providing a base classifier. The base classifier is a neural network. The method further includes receiving a class and a set of images associated with the class and splitting the set of images into an evaluation set and a training set. The method further includes updating the base classifier on-the-fly to provide an updated classifier. Updating the base classifier includes (1) extracting features for each image from the training set from the base classifier; (2) training the updated classifier using the extracted features; and (3) scoring the evaluation set with the updated classifier.

According to a second aspect, a device for updating a classifier on-the-fly is provided. The device includes a processor; a memory coupled to the processor; and a network interface coupled to the processor. The processor is configured to provide a base classifier. The base classifier is a neural network. The processor is further configured to receive a class and a set of images associated with the class and split the set of images into an evaluation set and a training set. The processor is further configured to update the base classifier on-the-fly to provide an updated classifier. Updating the base classifier includes (1) extracting features for each image from the training set from the base classifier; (2) training the updated classifier using the extracted features; and (3) scoring the evaluation set with the updated classifier.

According to some embodiments of any of the aspects disclosed herein, the received class and set of images are received from a user who specifies images corresponding to the class. In some embodiments, receiving the class and the set of images associated with the class includes presenting a first screen to a user, the first screen including a prompt for user input; receiving the user input from the user, the user input indicating the class; presenting a second screen to the user, the second screen including a plurality of selectable images; and receiving a selection from the user representing a subset of the plurality of selectable images, the selection indicating the set of images associated with the class. According to some embodiments, in response to a user requesting additional selectable images, a third screen is presented to the user, the third screen including the additional selectable images; and a second selection is received from the user representing a subset of the additional selectable images, the second selection indicating additional images to be included in the set of images associated with the class.

According to some embodiments, the method further includes (or the device's processor is further configured for) determining whether the updated classifier is satisfactory and, in response to determining that the updated classifier is not satisfactory repeating the following steps until the updated classifier is satisfactory: taking the updated classifier as the current base classifier; receiving additional images associated with the class; and updating the current base classifier on-the-fly to provide a current updated classifier, wherein updating the current base classifier includes (1) extracting features for each of the additional images from the current base classifier; (2) training the current updated classifier using the extracted features; and (3) scoring the evaluation set with the current updated classifier.

In some embodiments, extracting features for each image from the training set from the base classifier includes extracting output activation data from final layers of the base classifier. In some embodiments, training the updated classifier using the extracted features includes forming a positive and a negative set from the training set and using zero-shot and/or one-shot learning to train the updated classifier using the positive and negative sets. In some embodiments, a user is presented with classifier output of a validation set, and can choose to accept the updated classifier, to reject the updated classifier, or to continue updating the updated classifier with additional training data.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

A base classifier (such as, for example, a deep neural network as described in U.S. application Ser. No. 14/726,172) is previously learned, such as from a large corpus dataset.

In some embodiments, this large corpus dataset is multi-label and multi-class in nature. Multi label means that for a given image, multiple keywords can be assigned to it. Multi-class means that there are more than 2 unique keywords across the dataset.

In some embodiments, the distribution of keywords in the training dataset for training the base classifier will have a skewed distribution. For example, a certain tag may appear in x % of images in the training dataset, whereas another tag appears only y % of time, where x>>y.

In such a case (i.e., where there is a skewed distribution), one possible approach in accordance with embodiments of the present invention is to sample the rarer or less frequent class more aggressively than the highly populated class.

In certain embodiments, the rarer class may be aggressively sampled by a negative sampling scheme, such as the negative sampling scheme discussed in arxiv.org/pdf/1310.4546.pdf.

In certain embodiments, the rarer class may be aggressively sampled by SMOTE sampling, such as discussed in www.jair.org/media/953/live-953-2037-jair.pdf.

In certain embodiments, after a batch of images have been sampled (e.g., using one of the schemes discussed above), the ground truth class labels can be dropped within the batch inversely proportional to the frequency of the label's occurrence in the ground truth. In some embodiments, this negative sampling scheme with label dropping has improved performance over other methods.

In some embodiments, a new set of images is provided for a new class (e.g., such as provided from the user interface, as discussed below in the appended examples). The new set of images, in some embodiments, may be split into a training set and a validation set.

In addition to these sets, in some embodiments there is also a large database (termed a canonical negative set) that can act as a negative set.

In some embodiments, a subset of images from this negative set is determined, which may be selected such that it has minimal overlap to a set of keywords detected in the training set using the base classifier.

A feature vector corresponding to an image (both in positive and negative sets) can be created. In embodiments using a neural network for the base model, this may be done, for example, by looking at the output activation of the final layers of the trained based model neural network. In addition, a feature vector may be created for the image, e.g., by concatenating (or fusing) the measurements inside various layers in the deep neural network. In some embodiments, information from intermediate layers of the neural network may be used.

In alternate embodiments, subset of images from the negative class is identified whose feature vector distance is greatest (or at least separated by a margin) as compared to those of the feature vectors of the user specified image features.

In addition, in some embodiments, additional metadata may be used as features (e.g., user tags, exif information, captions attached to various images, and other textual reference of the image in other sources).

In certain embodiments, information from textual information (e.g., user tags, exif information, captions, and the like) can be represented in distributed semantic space by finding the embedding vectors of each word in the textual entity by using embedding techniques like word2vec and GloVe.

In case of representing multiple words at a time, a maximum or average of the activations of the embedding vectors may be used.

In certain embodiments, multiple words can be represented as a feature vector of finite size by using a Recurrent Neural Network. There are various possible variants of recurrent neural networks (RNNs) that can be used, such as, for example, LSTM and GRU style RNNs.

In certain embodiments, information from other modalities (e.g., user tags, exif information, captions attached to various images and other textual reference of the image in other sources) and features from the base model, can be used to augment the feature representation from the base model and the feature representation of the other modalities.

In certain embodiments, information from other modalities (e.g., user tags, exif information, captions attached to various images and other textual reference of the image in other sources) and features from the base model of neural network are fused together using a bilinear projection matrix. The parameters of this bilinear projection matrix can be learned by stochastic gradient descent (for example, as specified in WSABIE algorithm), or by using alternate least squares, or by some other appropriate method.

In accordance with some embodiments, a classifier may be trained between the feature vectors of the training set of the user specified images and the subset selected from the negative set. In some embodiments, the classifier may be linear or non-linear. Alternatively, a machine-learning ranker (either linear or non-linear) may be trained instead of a classifier.

A wide variety of methods that have been developed in the name of zero shot learning and one shot learning are applicable to embodiments of the present invention.

In some embodiments, the classifier can be found closed-form (see, e.g., hal.inria.fr/hal-00815747v1/document).

The speed of a classifier and the amount of time a user is willing to wait for results often determines the choice of classifier. In some embodiments, linear classifiers may be faster to train and to converge.

In some embodiments, the user is presented with the classifier output of the validation set, as a sorted list (e.g., in descending order) according to the classification or ranker score. In practice, a well-trained classifier will typically display good quality output towards the start of the list, and the quality of the output progressively deteriorates towards the end of the list. In some embodiments, the user may set an acceptable threshold, such as by clicking the point in the list to which the quality is acceptable.

In some embodiments, further numerical scores of classifier precision at various operational points can be also given.

It is important to note that the user may be an automated agent. All of these decisions can be made by a computer program or an automated system.

Depending on the quality of results, the user may decide to use the classifier, or continue collecting data or trash the existing classifier. The accepted classifier can be uploaded to a server or device, and be made live in near real time. The system can update by going through the database and re-classifying all the images using the new classifier and then augmenting the search index.

Embodiments of the present invention may be used in many different environments. For example, the following are exemplary use cases:

| Segment | End Results | Value Add |
| --- | --- | --- |
| (Stock) Photo Business | Photo Editors can define, train and use new keywords. | Custom Classifiers that fits the business use case (which can vary between different target segments, demography and users). The scale up the set of keywords on demand. In stock, business is defined the type of keywords attached to an image. A new keyword becomes market relevant, the business can quickly train, and deploy a classifier that will auto-tag such content. |
| Individual Users | Define custom keywords | Users can define custom tags that will be very specific to individual use cases, and usually not found in classical multi-tag environment. The data from his/her previous categories/collections/organization (for example made in adobe lightroom, previous search results) can be fed into the system directly. All his/her future content will be organized very similar to that of this particular data. |
| Online Marketers | Define classes from trending new concepts/hashtags. Targeted Image based Advertising | New trends (thus new concepts) pop into existence in social web. Often there is a kind of imagery people associate with these trends. Given the prerequisite of identifying new trends from social web or usage data, the system can crawl the data associated with these trends, and train a new classifier that can classify such images. The imagery associated with a concept changes based on users from various segments/demographics. By analyzing the imagery, custom classifiers can be trained to serve better advertising/marketing/awareness content for various users. |

As another example, for search-engine optimization (SEO) techniques to be maximally effective, new tags and keywords need to be generated. The on-the-fly classifier helps in training newly trending keywords, and adding the corresponding keywords to the static web page. This can be beneficial to the operator of the web page.

As will be appreciated, the systems and methods and computer program products disclosed in the above-referenced co-owned applications are generally applicable for the newly trained classifier or ranker disclosed by embodiments of the present invention.

Referring to FIGS. 1-7, exemplary methods, systems, and computer program products for updating a classifier on-the-fly are provided.

Figure 1:
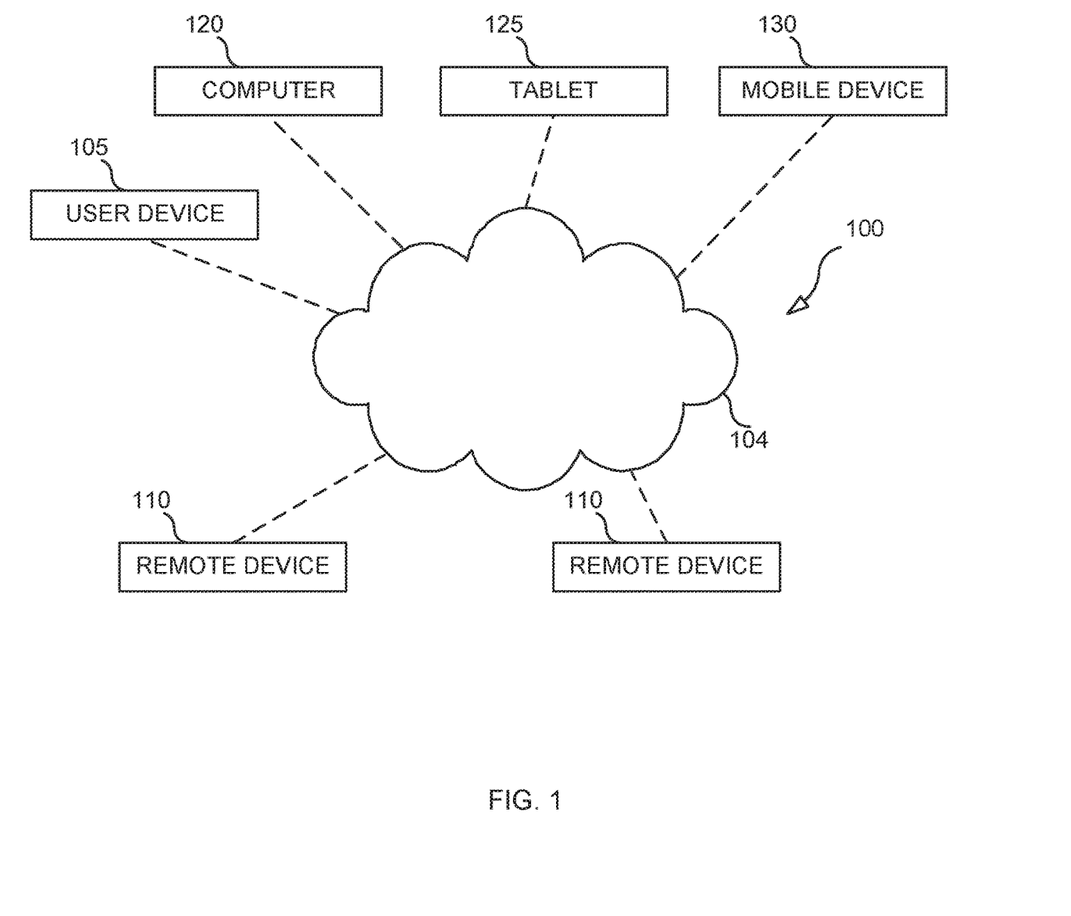
FIG. 1 illustrates an architecture of a communications system according to exemplary embodiments.

Referring now to FIG. 1, an exemplary architecture of a communication system in accordance with embodiments of the present invention is illustrated. System 100 includes at least one remote device 110 that is configured to communicate with one or more user devices 105 through a communications network 104 (e.g., the internet). Examples of user devices include a computer 120 (e.g., laptop or desktop), a tablet 125 (e.g., an iPad), and a mobile device 130 (e.g., a smartphone, such as, for an example, an iPhone). An example of a remote device 110 includes a server. The system, method and computer program product of the present invention can, for example, be deployed as a user/client-server implementation, as an ASP model, or as a standalone application running on a user device 105.

The user device 105 can be configured to communicate with one or more remote devices 110 via the network 104. Remote devices 110 are configured to generate, maintain, and host the computer program product in one embodiment. The remote devices 110 generate, maintain and host web pages (e.g., HTML documents) that embody the present invention. The remote devices 110 include services associated with rendering dynamic web pages, such as data storage services, security services, etc. Accordingly, remote devices 110 can include a conventional hardware arrangement and can be outfitted with software and/or firmware for performing web server functions for performing aspects of the present invention, such as, for example, javascript/jquery, HTML5, CSS2/3, and facilities for SSL, MySQL, PHP, SOAP, etc.

Remote devices 110 may be coupled with a data storage facility, which may include one or more local or remote memory systems or units, and can include one or more databases and/or file systems for storing data, media, graphics, HTML documents, XML documents, etc.

Remote devices 110 can be configured to include an admin function, which enables an administrator to perform system-related functions. The system-related functions can include maintaining user records, performing upgrades on the software and topic content, and the moderation of tasks.

Figure 2:
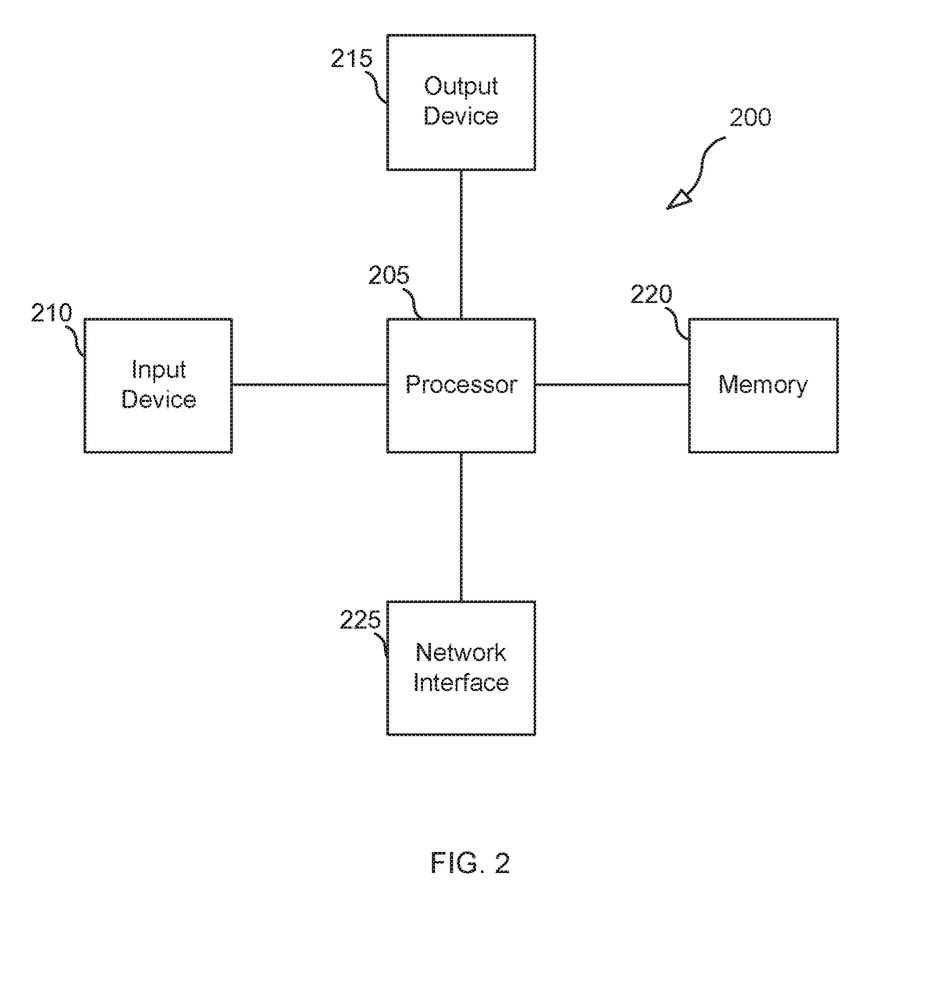
FIG. 2 illustrates a block diagram of a device according to exemplary embodiments.

Referring to FIG. 2, a block diagram of a device 200, such as for example, user device 105, computer 120, tablet 125, and mobile device 130, in accordance with exemplary embodiments of the present invention is illustrated. As shown in FIG. 2, the device 200 may include a processor 205, which may include one or more microprocessors and/or one or more circuits, such as an application specific integrated circuit (ASIC), field-programmable gate arrays (FPGAs), etc.

The device 200 may include a network interface 225. The network interface 225 is configured to enable communication with a communication network, using a wired and/or wireless connection.

The device 200 may include memory 220, such as non-transitive, which may include one or more non-volatile storage devices and/or one or more volatile storage devices (e.g., random access memory (RAM)). In instances where the device 200 includes a microprocessor, computer readable program code may be stored in a computer readable medium or memory, such as, but not limited to magnetic media (e.g., a hard disk), optical media (e.g., a OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described below and herein. In other embodiments, the device is configured to perform steps described below without the need for code.

It will be recognized by one skilled in the art that these operations, algorithms, logic, method steps, routines, sub-routines, and modules may be implemented in software, in firmware, in special purpose digital logic, and any combination thereof without deviating from the spirit and scope of the present invention as recited within the claims attached hereto.

The device 200 may include an input device 210. The input device is configured to receive an input from either a user or a hardware or software component. Examples of an input device 210 include a keyboard, mouse, microphone, touch screen and software enabling interaction with a touch screen, etc. The device can also include an output device 215. Examples of output devices 215 include monitors, televisions, mobile device screens, tablet screens, speakers, remote screens, etc. The output device 215 can be configured to display images, media files, text, or video, or play audio to a user through speaker output.

Figure 3:
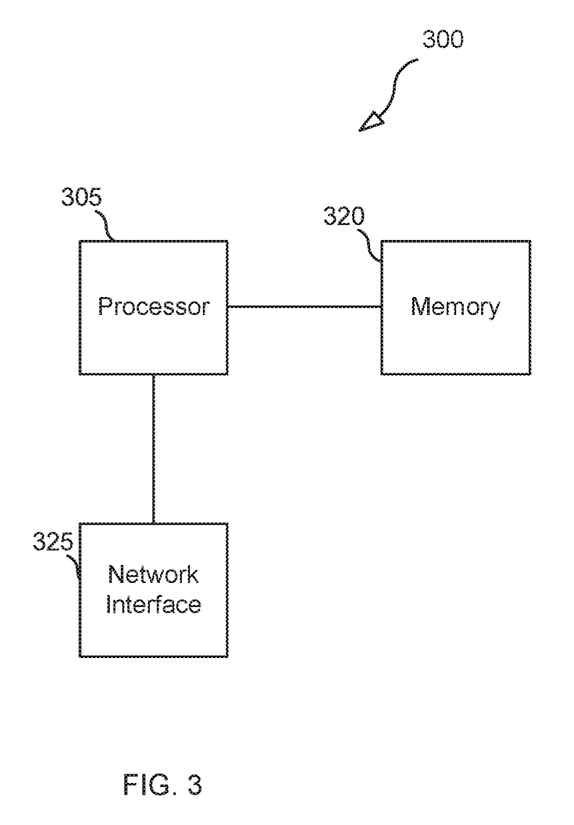
FIG. 3 illustrates a block diagram of a remote device according to exemplary embodiments.

Referring now to FIG. 3, a block diagram of a remote device in accordance with exemplary embodiments of the present invention is illustrated. As shown in FIG. 3, the remote device 300 may include a network interface 315 for transmitting and receiving data, a processor 305 for controlling operation of the server device 300, and a memory 310 for storing computer readable instructions (e.g., software) and data. The network interface 315 and memory 310 are coupled to and communicate with the processor 305. Processor 305 controls the operation of network interface 315 and memory 310 and the flow of data and functionality between them. In various embodiments inputs can come from the device 200, to the remote device 300, via the network interface 315. Processing can occur at the remote device 300, at the device 200, or at both. In various embodiments, remote device 300 may be a server.

Processor 305 may include one or more microprocessors, and/or one or more circuits, such as an application specific integrated circuit (ASIC), field-programmable gate arrays (FPGAs), etc. Network interface 225 can be configured to enable communication with a communication network, using a wired and/or wireless connection. Memory 310 can include one or more non-volatile storage devices and/or one or more volatile storage devices (e.g., random access memory (RAM)). In instances where remote device 300 includes a microprocessor, computer readable program code may be stored in a computer readable medium, such as, but not limited to magnetic media (e.g., a hard disk), optical media (e.g., a DVD), memory devices (e.g., random access memory, flash memory), etc. In other embodiments, the device is configured to perform steps described below without the need for code. It will be recognized by one skilled in the art that these operations, logic, method steps, routines, algorithms, sub-routines, and modules may be implemented in software, in firmware, in special purpose digital logic, and any combination thereof without deviating from the spirit and scope of the present invention as recited within the claims attached hereto.

Figure 4:
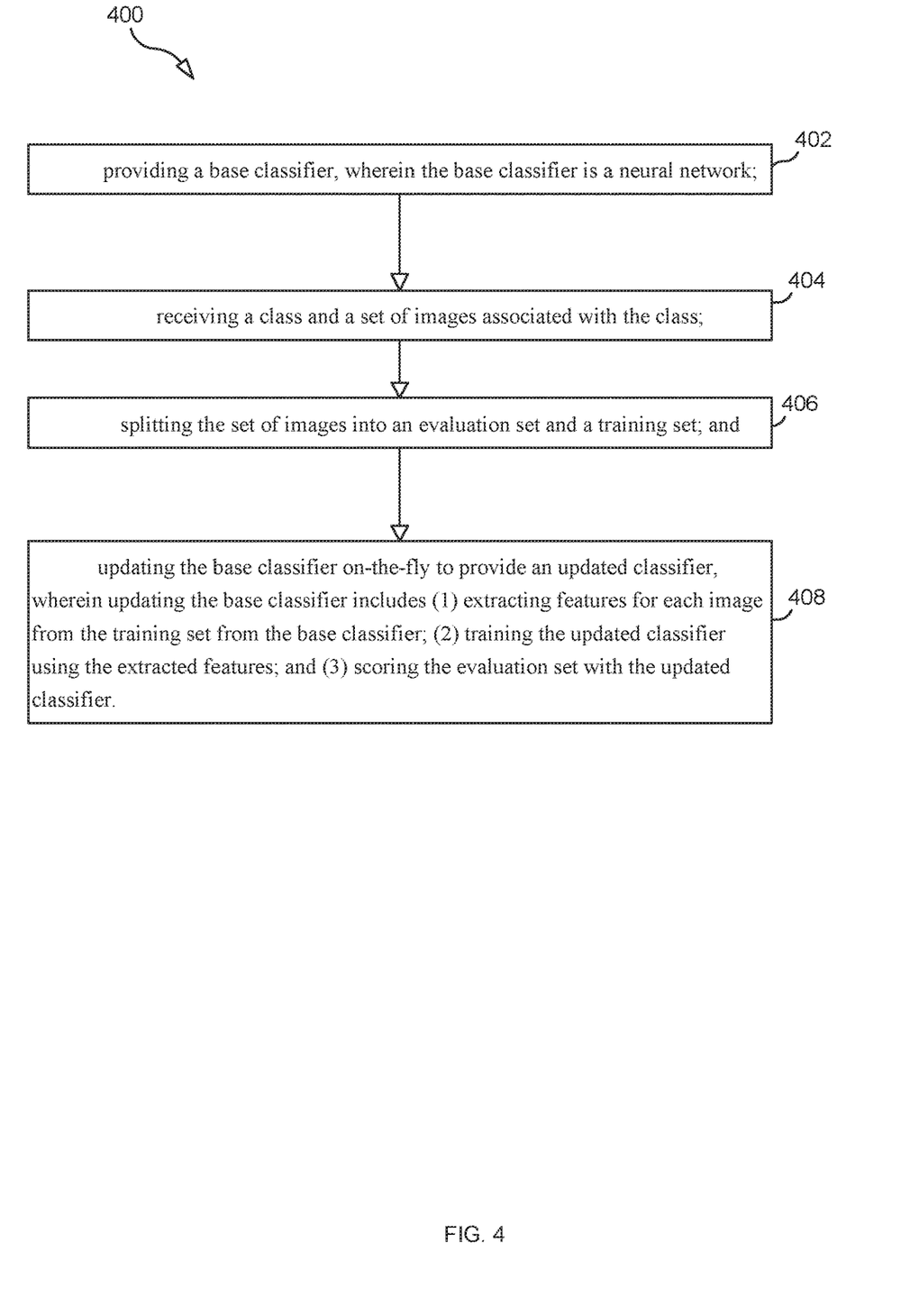
FIG. 4 illustrates a flow chart for a process according to exemplary embodiments.

FIG. 4 is a flow diagram illustrating steps of an exemplary method 400 of updating a classifier on-the-fly.

In an embodiment of the present invention, method 400 includes providing a base classifier, where the base classifier is a neural network (step 402).

The method further includes receiving a class and a set of images associated with the class (step 404). In embodiments, the received class and set of images are received from a user who specifies images corresponding to the class. In embodiments, receiving the class and the set of images associated with the class includes presenting a first screen to a user, the first screen including a prompt for user input; receiving the user input from the user, the user input indicating the class; presenting a second screen to the user, the second screen including a plurality of selectable images; and receiving a selection from the user representing a subset of the plurality of selectable images, the selection indicating the set of images associated with the class. In embodiments, additional screens of images may be presented to the user (e.g., at the user's request, or otherwise such as by the network detecting more images are needed for robust training), and additional training images may be received that are associated with the class. For example, the method may further include, in response to a user requesting additional selectable images, presenting a third screen to the user, the third screen including the additional selectable images; and receiving a second selection from the user representing a subset of the additional selectable images, the second selection indicating additional images to be included in the set of images associated with the class.

The method further includes splitting the set of images into an evaluation set and a training set (step 406).

The method further includes updating the base classifier on-the-fly to provide an updated classifier (step 408). Updating the base classifier includes (1) extracting features for each image from the training set from the base classifier; (2) training the updated classifier using the extracted features; and (3) scoring the evaluation set with the updated classifier. In embodiments, extracting features for each image from the training set from the base classifier includes extracting output activation data from final layers of the base classifier. For example, features may be computed using the output of a penultimate layer of a deep convolution neural network. In embodiments, training the updated classifier using the extracted features includes forming a positive and a negative set from the training set and using zero-shot and/or one-shot learning to train the updated classifier using the positive and negative sets.

In embodiments, many-shot learners can be classifiers such as SVMs, Random Forest, and so on, or they can be another neural network such as a Multi-Layer Perceptron. For example, a 3 layer multi-layer perceptron neural network with ReLU non-linearities and batch normalization within the layers may be used.

In some embodiments, previously successfully trained classes using the mini-network or random network are stored in the disk. Given a new class, the learning of a mini-network can be regularized by the weights on the successfully trained mini-networks or other classifier. In embodiments, the relative proportion from which weights of previously successfully trained classes used to regularize the current training of the mini classifier may be selected using a Recurrent Neural Network (RNN). There are various possible variants of RNNs that can be used, such as, for example, LSTM and GRU style RNNs. In some embodiments, the relative proportion from which weights of previously successfully trained classes used to regularize the current training of the mini classifier may be selected using a neural network which has a notion of differentiable memory.

In embodiments, the method may be performed iteratively, as the classifier is continually updated on-the-fly to provide more accurate results. In such embodiments, after each round of updating, the user may be presented with the results of the classifier (e.g., ranked according to score), and the user may determine whether further training is needed. For instance, see FIG. 7 and the accompanying description below. For example, the method may include determining whether the updated classifier is satisfactory and, in response to determining that the updated classifier is not satisfactory repeating the following steps until the updated classifier is satisfactory: taking the updated classifier as the current base classifier; receiving additional images associated with the class; and updating the current base classifier on-the-fly to provide a current updated classifier, wherein updating the current base classifier includes (1) extracting features for each of the additional images from the current base classifier; (2) training the current updated classifier using the extracted features; and (3) scoring the evaluation set with the current updated classifier. In some embodiments, a user is presented with classifier output of a validation set, and can choose to accept the updated classifier, to reject the updated classifier, or to continue updating the updated classifier with additional training data.

Figure 5:
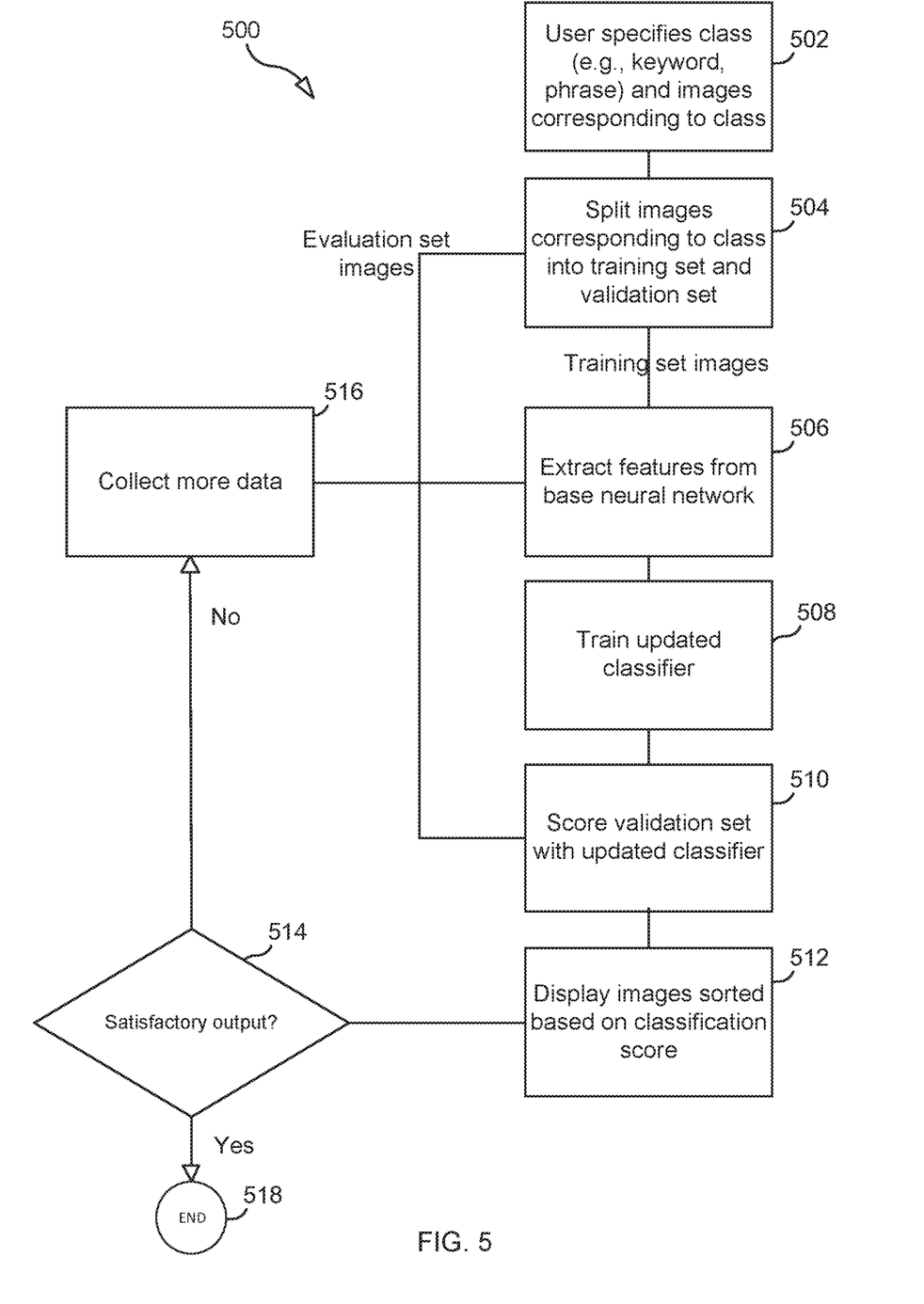
FIG. 5 illustrates a block diagram for a system according to exemplary embodiments.

FIG. 5 is a block diagram for a system 500 according to exemplary embodiments. According to system 500, a user specifies a class (e.g., keyword, phrase) and images corresponding to the class (block 502). The images corresponding to the class are then split into a training set and a validation set (block 504). The evaluation set images are held back until block 510, after training the updated classifier. The training set images are fed into block 506. For each image in the training set, features are extracted from the base neural network (block 506). Using these features, the updated classifier is trained (block 508). This training may include using zero-shot and/or one-shot learning. A negative set may be utilized. Keywords that do not overlap to example images from the canonical negative training set may be found, and such keywords may be utilized during the training. Upon completion of the training, the validation set is scored using the updated classifier (block 510). Also, upon completion of the training, images are displayed sorted according to their classification score (block 512). System 500 determines whether the displayed images are adequate, that is, whether the updated classifier is satisfactory (block 514). This determination may be made by a computer, based on e.g., preset criteria, based on comparison with other classifiers, based on aesthetic models, and/or other factors. The determination may also be made by (or may be additionally based on) user input. If the updated classifier is satisfactory, then training is complete (block 518). Various administrative details may be handled by system 500 at this time. For example, the updated classifier parameters may be uploaded to a live or production system, and a database may be rescored using the updated classifier resulting in an updated, or repopulated, search index.

If the updated classifier is not satisfactory, however, then more data is collected (block 516). This data is then fed into the training sequence, e.g., at block 506 (extract features). The new data provides additional data by which the classifier can be iteratively updated until the updated classifier is satisfactory.

Figure 6:
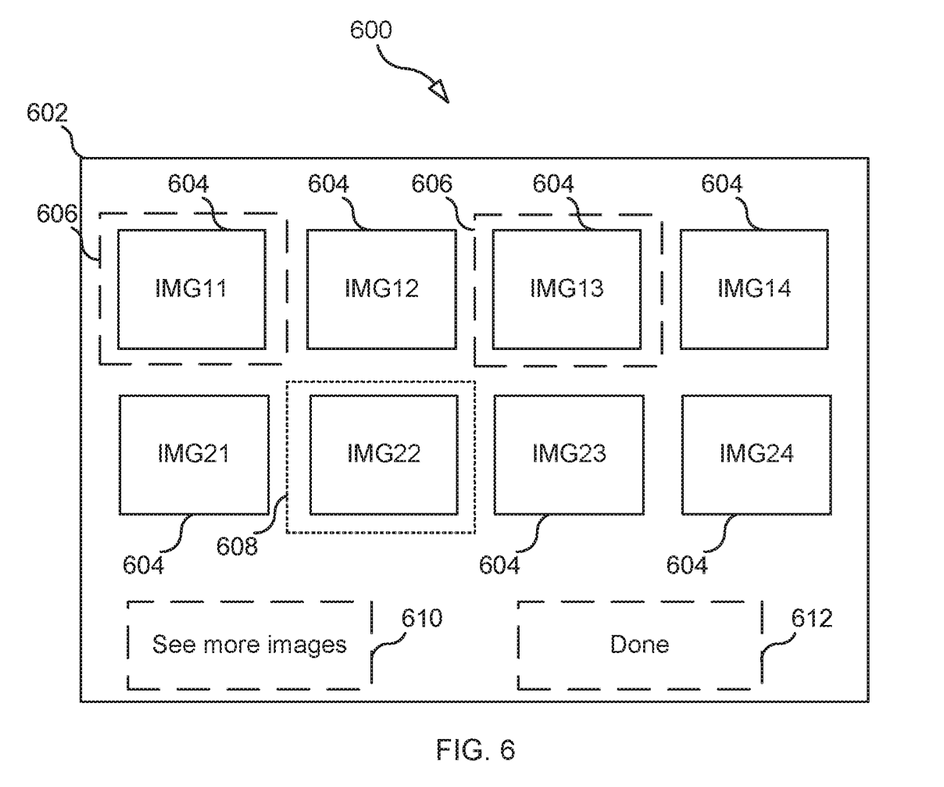
FIG. 6 illustrates a graphical user interface (GUI) according to exemplary embodiments.

FIG. 6 illustrates an exemplary graphical user interface (GUI) 600 according to exemplary embodiments. The GUI 600 may include a display 602 including one or more images 604. In one embodiment (as shown), images 604 may be arranged by row and column in a grid, but images 604 may also be presented in other suitable ways. GUI 600 provides a mechanism to allow a user to indicate an association (e.g., by clicking, by keyboard, or by other input mechanisms). For example, the user may indicate that the user associates the image to a given class (e.g., the image is an instance of that class). These images are indicated in FIG. 6 with a dashed-box 606 (long dashes). In some embodiments, display 602 may include a colored-outline around the image, such as a green outline, to indicate this association. The user may also indicate that the image is not associated with the class (e.g., the image is not an instance of the class). These images are indicated in FIG. 6 with a dashed-box 608 (short dashes). In some embodiments, display 602 may include a colored-outline around the image, such as a red outline, to indicate this association. The user may indicate that the image is neutral with respect to the class (e.g., the user expresses no association about whether the image is or is not an instance of the class). These images are indicated by the lack of a box surrounding them. In some embodiments, display 602 may include a colored-outline around the image, such as a grey outline, or may include no outline, to indicate this association.

Display 602 may also include additional information. For example, button 610 allows a user to indicate that the user wants to see more images, so that the user can indicate an association for additional images. The user may decide to do this, for example, to provide additional training data and further train the model. When the user selects this button, GUI 602 may transmit the received indications of the associations to a server (possibly a remote server) to update the model. Display 602 may subsequently display additional images 604 that are selected based at least in part on the updated model. As another example, button 612 allows a user to indicate that the user is finished providing input. When the user selects this button, GUI 602 may transmit the received indications of the associations to a server (possibly a remote server) to update the model. Display 602 may subsequently display another screen (e.g., a screen the user was looking at before opting to provide additional training data). Other buttons, menus, or other GUI inputs and design elements, are also possible, and may be used.

Figure 7:
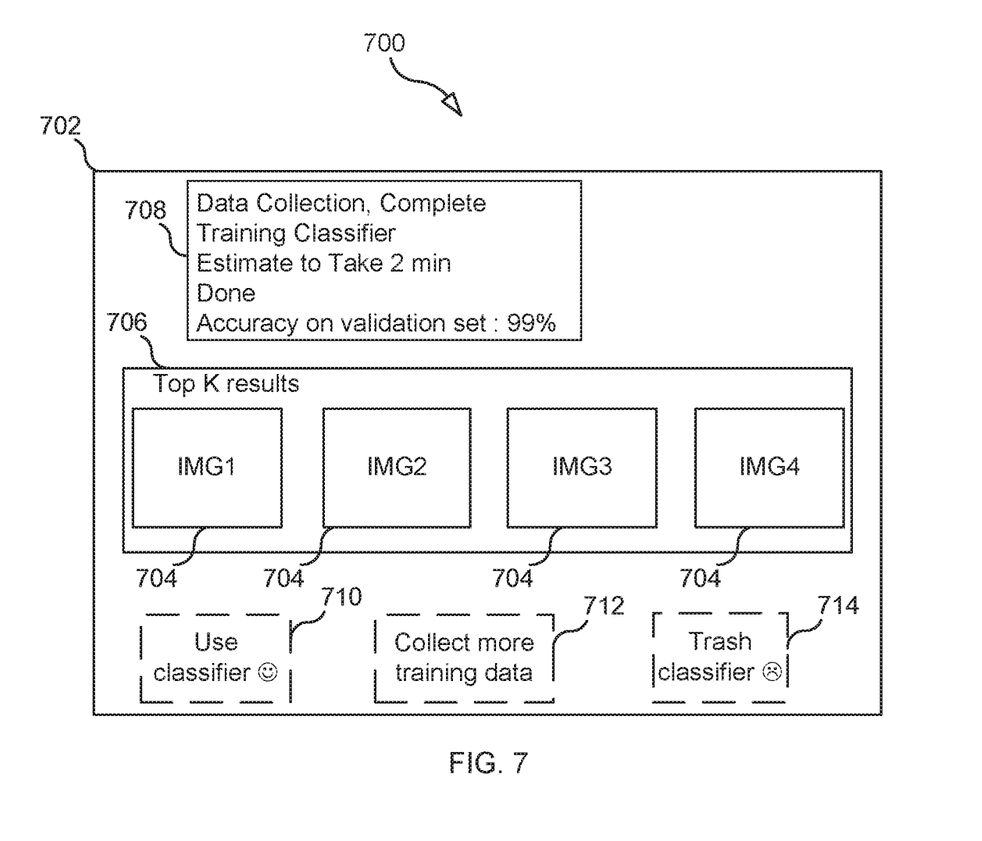
FIG. 7 illustrates a graphical user interface (GUI) according to exemplary embodiments.

FIG. 7 illustrates an exemplary graphical user interface (GUI) 700 according to exemplary embodiments. The GUI 700 may include a display 702 including one or more images 704. The group of images 704 may represent, for example, the top k results 706 from the recently updated classifier. Status notes 708 regarding the training process may also be displayed, including an accuracy on the validation set. The display 702 may also include buttons (or other input) allowing a user to select some action. For example, button 710 may be selected if the user is content with the classifier output. On the other hand, if the user is not content with the classifier output, button 712 may be selected to allow additional training data to be collected, or button 714 may be selected to abandon the classifier (e.g., if the results are too poor and not enough training data is available).

In embodiments where a processor is included, computer readable program code (CRPC) may be stored in a computer readable medium, such as, but not limited to magnetic media (e.g., a hard disk), optical media (e.g., a DVD), memory devices (e.g., random access memory), and the like. In some embodiments, computer readable program code is configured such that when executed by a processor, the code causes the processor to perform steps described above (e.g., steps described above with reference to the flow charts shown in FIGS. 4 and 5).

In some embodiments, the training of new classes might be done in mobile devices, such as tablets, smartphones, and other low-powered portable devices. In some embodiments, the trained on-the-fly classifier can be transmitted over the wire/network to a new device, where the classifier can be used. In some embodiments, if the base network features are stored in the device, only the updated on-the-fly classifier needs to be executed. In a GPU powered device, for example, more than 20,000 images per second can be processed in some embodiments, and on CPUs, around 2,000 images per second can be processed in such embodiments.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method of updating a classifier on-the-fly comprising:
   providing a base classifier, wherein the base classifier is a neural network;
   receiving a class and a set of images associated with the class;
   splitting the set of images into an evaluation set and a training set; and
   updating the base classifier on-the-fly to provide an updated classifier, wherein updating the base classifier includes (1) extracting features for each image from the training set from the base classifier; (2) training the updated classifier using the extracted features; and (3) scoring the evaluation set with the updated classifier,
   wherein extracting features for each image from the training set from the base classifier includes extracting output activation data from final layers of the base classifier, and
   wherein training the updated classifier using the extracted features includes using the extracted activation data as a feature to train the updated classifier.

2. The method according to claim 1, wherein the received class and set of images are received from a user who specifies images corresponding to the class.

3. The method according to claim 1, wherein receiving the class and the set of images associated with the class comprises:
   presenting a first screen to a user, the first screen including a prompt for user input;
   receiving the user input from the user, the user input indicating the class;
   presenting a second screen to the user, the second screen including a plurality of selectable images; and
   receiving a selection from the user representing a subset of the plurality of selectable images, the selection indicating the set of images associated with the class.

4. The method according to claim 3, further comprising:
   in response to a user requesting additional selectable images, presenting a third screen to the user, the third screen including the additional selectable images; and
   receiving a second selection from the user representing a subset of the additional selectable images, the second selection indicating additional images to be included in the set of images associated with the class.

5. The method according to claim 1, further comprising:
   determining whether the updated classifier is satisfactory and, in response to determining that the updated classifier is not satisfactory repeating the following steps until the updated classifier is satisfactory:
   taking the updated classifier as the current base classifier;
   receiving additional images associated with the class;

updating the current base classifier on-the-fly to provide a current updated classifier, wherein updating the current base classifier includes (1) extracting features for each of the additional images from the current base classifier; (2) training the current updated classifier using the extracted features; and (3) scoring the evaluation set with the current updated classifier.

6. The method according to claim 1, wherein training the updated classifier using the extracted features includes forming a positive and a negative set from the training set and using zero-shot and/or one-shot learning to train the updated classifier using the positive and negative sets.

7. The method according to claim 1, wherein a user is presented with classifier output of a validation set, and can choose to accept the updated classifier, to reject the updated classifier, or to continue updating the updated classifier with additional training data.

8. A device for updating a classifier on-the-fly, comprising:
   a processor; and
   a memory coupled to the processor;
   wherein the processor is configured to:
      provide a base classifier, wherein the base classifier is a neural network;
      receive a class and a set of images associated with the class;
      split the set of images into an evaluation set and a training set; and
      update the base classifier on-the-fly to provide an updated classifier, wherein updating the base classifier includes (1) extracting features for each image from the training set from the base classifier; (2) training the updated classifier using the extracted features; and (3) scoring the evaluation set with the updated classifier,
   wherein extracting features for each image from the training set from the base classifier includes extracting output activation data from final layers of the base classifier, and
   wherein training the updated classifier using the extracted features includes using the extracted activation data as a feature to train the updated classifier.

9. The device according to claim 8, wherein the received class and set of images are received from a user who specifies images corresponding to the class.

10. The device according to claim 8, wherein receiving the class and the set of images associated with the class comprises:
   presenting a first screen to a user, the first screen including a prompt for user input;
   receiving the user input from the user, the user input indicating the class;
   presenting a second screen to the user, the second screen including a plurality of selectable images; and
   receiving a selection from the user representing a subset of the plurality of selectable images, the selection indicating the set of images associated with the class.

11. The device according to claim 10, wherein the processor is further configured to:
   in response to a user requesting additional selectable images, present a third screen to the user, the third screen including the additional selectable images; and
   receive a second selection from the user representing a subset of the additional selectable images, the second selection indicating additional images to be included in the set of images associated with the class.

12. The device according to claim 8, wherein the processor is further configured to:
   determine whether the updated classifier is satisfactory and, in response to determining that the updated classifier is not satisfactory repeat the following steps until the updated classifier is satisfactory:
   take the updated classifier as the current base classifier;
   receive additional images associated with the class;
   update the current base classifier on-the-fly to provide a current updated classifier, wherein updating the current base classifier includes (1) extracting features for each of the additional images from the current base classifier; (2) training the current updated classifier using the extracted features; and (3) scoring the evaluation set with the current updated classifier.

13. The device according to claim 8, wherein training the updated classifier using the extracted features includes forming a positive and a negative set from the training set and using zero-shot and/or one-shot learning to train the updated classifier using the positive and negative sets.

14. The device according to claim 8, wherein the processor is further configured to present a user with classifier output of a validation set, such that the user can choose to accept the updated classifier, to reject the updated classifier, or to continue updating the updated classifier with additional training data.

* * * * *